United States Patent
Tsingas et al.

(10) Patent No.: US 10,656,294 B2
(45) Date of Patent: May 19, 2020

(54) GENERATING A VELOCITY MODEL USING SUBSURFACE AZIMUTH AND REFLECTION ANGLE DEPENDENT FULL WAVEFORM INVERSION

(71) Applicant: Saudi Arabian Oil Company, Dhahran (SA)

(72) Inventors: Constantinos Tsingas, Dhahran (SA); Wooden Jeong, Dhahran (SA); Young Seo Kim, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 347 days.

(21) Appl. No.: 15/598,030

(22) Filed: May 17, 2017

(65) Prior Publication Data

US 2018/0335532 A1 Nov. 22, 2018

(51) Int. Cl.
*G01V 1/30* (2006.01)
*G01V 1/28* (2006.01)
*G01V 1/36* (2006.01)

(52) U.S. Cl.
CPC .............. *G01V 1/303* (2013.01); *G01V 1/282* (2013.01); *G01V 1/364* (2013.01); *G01V 2210/6222* (2013.01); *G01V 2210/679* (2013.01)

(58) Field of Classification Search
CPC ..... G01V 2210/6222; G01V 2210/679; G01V 1/303; G01V 1/282; G01V 1/364
See application file for complete search history.

(56) References Cited

U.S. PATENT DOCUMENTS 8,437,998 B2 5/2013 Routh et al.
8,879,355 B2 11/2014 Soubaras et al.
(Continued)

FOREIGN PATENT DOCUMENTS

WO WO2015178789 A1 11/2015

OTHER PUBLICATIONS

Davydenko et al., "Full wavefield migration, using internal multiples for undershooting," XP055496689, SEG Technical Program Expanded Abstracts 2013, Sep. 1, 2013, 5 pages.
(Continued)

*Primary Examiner* — Sujoy K Kundu
*Assistant Examiner* — Terence E Stifter, Jr.
(74) *Attorney, Agent, or Firm* — Fish & Richardson P.C.

(57) ABSTRACT

The present disclosure describes methods and systems, including computer-implemented methods, computer program products, and computer systems, for generating a velocity model for a subsurface area. One computer-implemented method includes obtaining, at a data processing apparatus, source wavefields and residual wavefields, wherein the source wavefields and the residual wavefields are calculated based on seismic data associated with the subsurface area; decomposing, by the data processing apparatus, the source wavefields and the residual wavefields into a subsurface azimuth and reflection angle domain; calculating, by the data processing apparatus, a plurality of gradient direction components based on the decomposed source wavefields and the residual wavefields; scaling, by the data processing apparatus, the plurality of gradient direction components based on azimuths and angles associated with each of the plurality of gradient direction components; calculating a gradient direction based on the scaled gradient direction components; and generating the velocity model using the gradient direction.

20 Claims, 15 Drawing Sheets

(8 of 15 Drawing Sheet(s) Filed in Color)

(56) References Cited

U.S. PATENT DOCUMENTS

| | | | |
|---|---|---|---|
| 9,128,205 B2 | 9/2015 | Guan et al. | |
| 9,244,181 B2 | 1/2016 | Rickett et al. | |
| 2012/0075954 A1* | 3/2012 | Xu | G01V 1/303 367/38 |
| 2013/0294196 A1* | 11/2013 | Childs | G01V 1/301 367/46 |
| 2013/0311149 A1* | 11/2013 | Tang | G06F 17/50 703/2 |
| 2014/0149046 A1 | 5/2014 | Baina et al. | |
| 2014/0200816 A1 | 7/2014 | Peng et al. | |
| 2014/0293744 A1* | 10/2014 | Zhang | G01V 1/28 367/53 |
| 2016/0187507 A1 | 6/2016 | Brenders et al. | |
| 2017/0010373 A1 | 1/2017 | Ayeni et al. | |
| 2017/0038490 A1 | 2/2017 | Hu | |

OTHER PUBLICATIONS

International Search Report and Written Opinion issued in International Application No. PCT/US2018/031611 dated Aug. 13, 2018, 15 pages.

Horn et al., "Determining Optical Flow," Artificial Intelligence, vol. 17, No. 1-3, Published in 1981, pp. 185-203.

Tang et al., "Tomographically Enhanced Full Waveform Inversion," 83rd Annual International Meeting, SEG, Expanded Abstracts, Published in 2013, pp. 1037-1041.

Wang et al., "Taking Advantage of Wave Field Decomposition in Full Waveform Inversion," 75th EAGE Conference & Exhibition, Extended Abstracts, Tu-07-08, Jun. 2013, 5 pages.

Xie, "An Angle-Domain Wavenumber Filter for Multi-Scale Full-Waveform Inversion," 85th Annual International Meeting, SEG, Expanded Abstracts, Published in 2015, pp. 1132-1137.

Alkhalifah, "Scattering Angle Based Filtering of the Waveform Inversion Gradients," Geophysical Journal International, 200, Published in 2015, pp. 363-373.

* cited by examiner

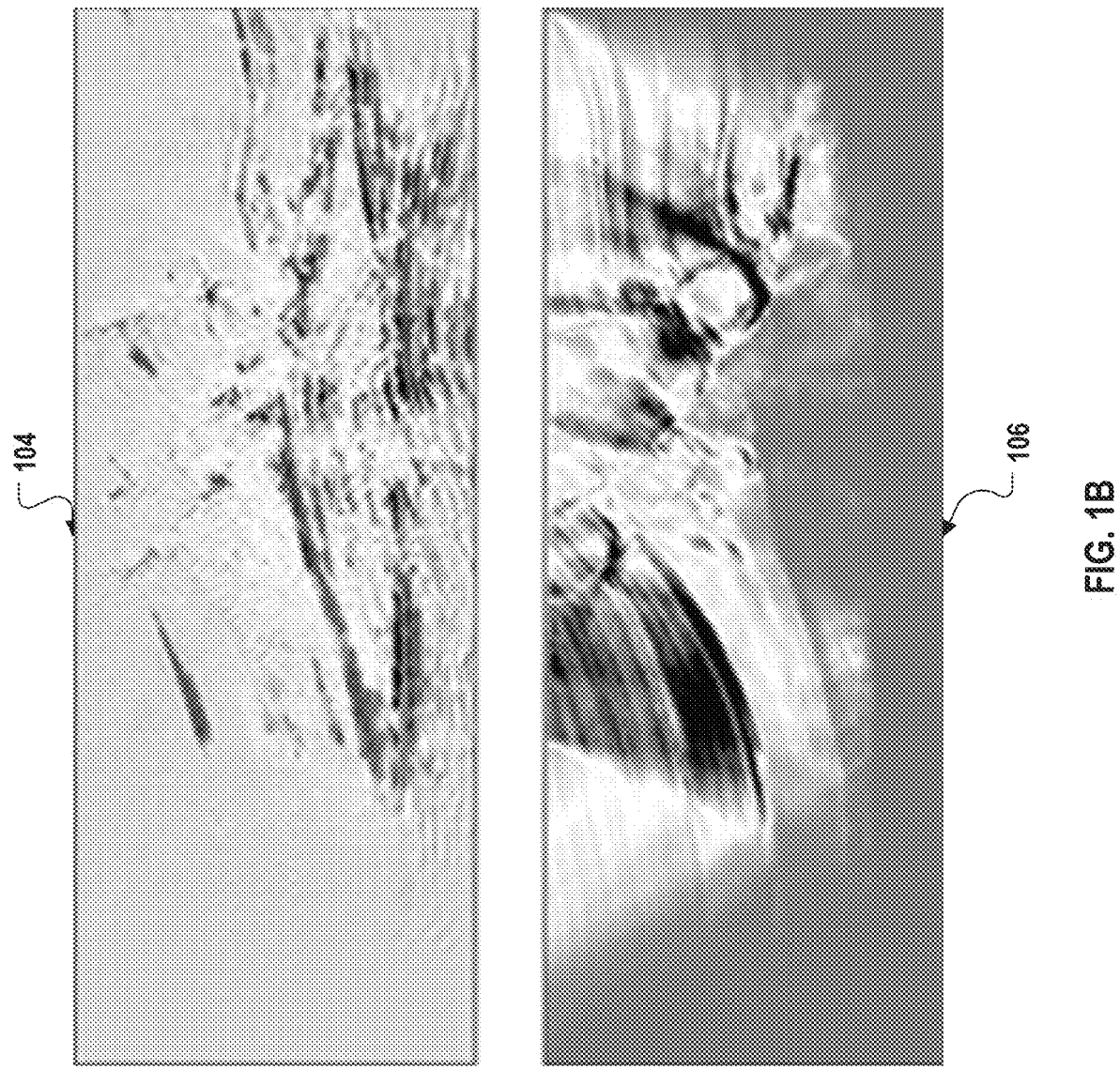

GENERATING A VELOCITY MODEL USING SUBSURFACE AZIMUTH AND REFLECTION ANGLE DEPENDENT FULL WAVEFORM INVERSION

TECHNICAL FIELD

This disclosure relates to generating a velocity model of subsurface structures.

BACKGROUND

In a geophysics analysis, a velocity model is used in generating images of the subsurface structure. The velocity model is an important factor that affects the quality of the image of the subsurface structure. A good velocity model can provide better understanding of the subsurface structure and improve the efficiency of a hydrocarbon exploration or production operation in the geographic area

SUMMARY

The present disclosure describes methods and systems, including computer-implemented methods, computer program products, and computer systems for generating a velocity model. One computer-implemented method for generating a velocity model includes obtaining, at a data processing apparatus, source wavefields and residual wavefields, wherein the source wavefields and the residual wavefields are calculated based on seismic data associated with the subsurface area; decomposing, by the data processing apparatus, the source wavefields and the residual wavefields into a subsurface azimuth and reflection angle domain; calculating, by the data processing apparatus, a plurality of gradient direction components based on the decomposed source wavefields and the residual wavefields; scaling, by the data processing apparatus, the plurality of gradient direction components based on azimuths and angles associated with each of the plurality of gradient direction components; calculating, by the data processing apparatus, a gradient direction based on the scaled gradient direction components; and generating the velocity model using the gradient direction.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

Like reference numbers and designations in the various drawings indicate like elements.

DETAILED DESCRIPTION

Figure 1A:
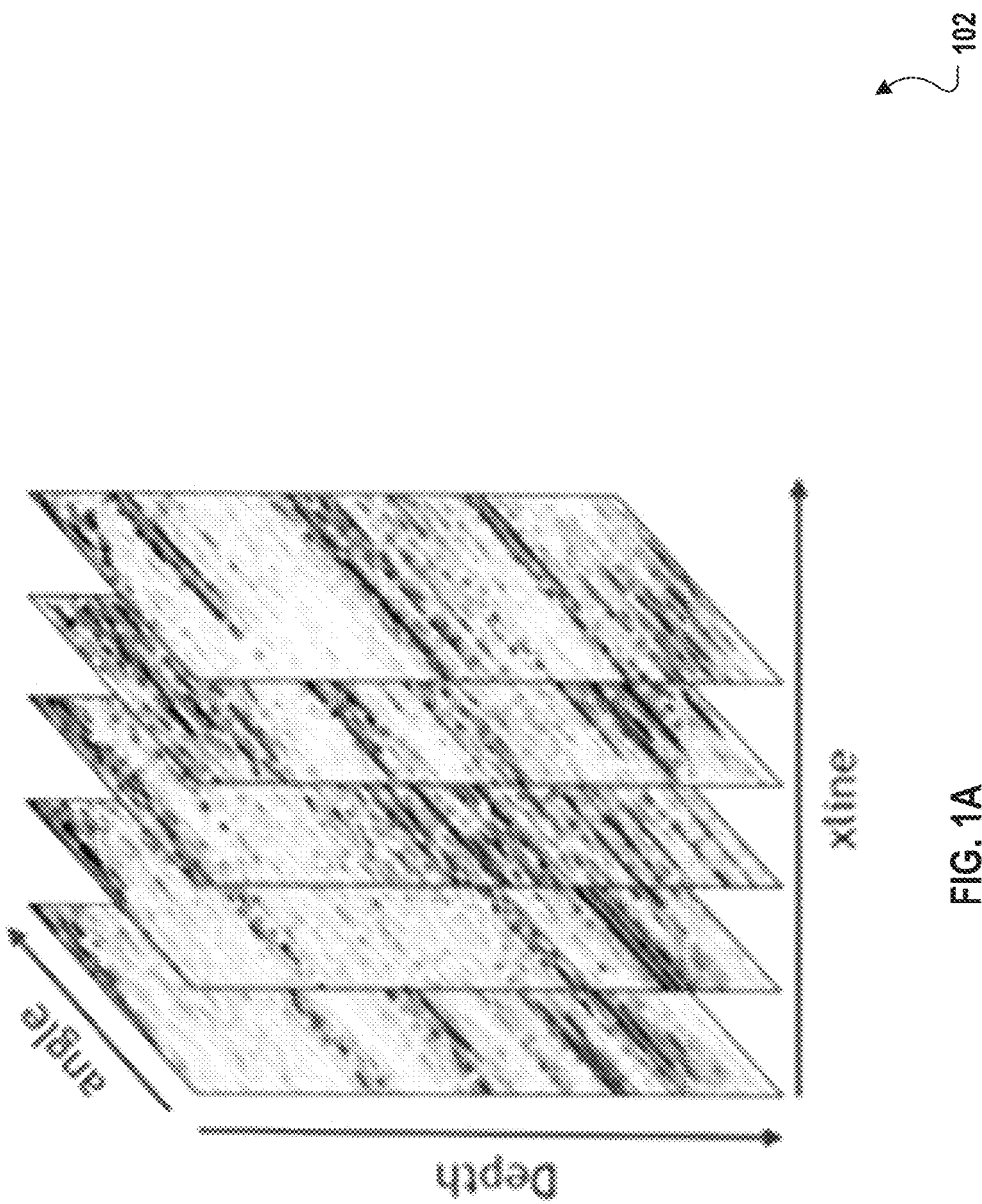
FIG. 1 (including FIGS. 1A and 1B) illustrates subsurface images, according to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes methods and systems, including computer-implemented methods, computer program products, and computer systems, for generating a velocity model. In some cases, seismic signals can be transmitted into the subsurface of the earth, at a source location by a source device. Examples of the seismic signals include acoustic signals. The seismic signals travel through the subsurface and can be received by a receiver device placed at a receiver location. In some cases, the source device, the receiver device, or a combination thereof can be placed at the surface. The signals can propagate downwards until they reach a reflecting structure and reflect upwards, towards the surface. Because the signals have refracted and reflected through the substructure, the characteristics of the received signals contain information of the substructure. The received signals can be analyzed to produce images of the subsurface structure.

In a marine survey, air guns and hydrophones can be used as the source devices and the receiver devices, respectively. During the acquisition, seismic sources are exploded from arrays of air guns. The reflected and refracted signals are acquired by streamers of hydrophones. In a land acquisition, dynamite can be used an explosive source and a geophone is employed as a receiver device. In another example, vibratory trucks can be used as source devices. Other devices that generate and receive seismic signals can also be used.

In some cases, seismic data including the sampled received signals can be collected to build common image gathers (CIGs), or common reflection points (CRP). In a geophysics analysis, CIGs refer to subsets of the whole image with fixed surface location for measuring variations between the partial images at fixed image points. If the partial images are a function of the reflection angles, the corresponding CIGs are referred to as Common Angle Gathers (CAGs) or Angle Domain Common Image Gathers (ADCIGs).

In some cases, the CAGs can be used to determine amplitude variation with angle analysis, migration velocity quality control and migration velocity analysis. When the migration velocity is correct, the images from various incident angles focus on the same depth, thus generating flat events on the CAGs. In contrast, when the velocity has errors, the events in CAGs become non-flat. Measuring of residual moveout from the non-flat events can be used for estimating the migration velocity. Such velocity estimation can be carried out by using computer tomography algorithms. The estimated migration velocity can be used to refine the velocity model and determine the correct velocity for signal propagating through the substructure. With a correct velocity model, the images of the substructure can be generated based on the collected seismic data.

In some implementations, reverse time migration (RTM) can be used in analysis migrations. The RTM algorithm includes calculations of forward propagation of the source wavefield, the backward propagation of the receiver wavefield, and the associated imaging condition between the two computed wavefields. In some cases, source wavefield and receiver wavefield can be referred to as forward wavefield and backward wavefield, respectively.

Using the two-way wave equation, RTM can generate images of the complex subsurface structure (subsalt), focus the steeply dipping events (salt flank area) and provide more accurate image amplitudes for seismic interpretation. Therefore, RTM CAGs can be used in the migration velocity analysis instead of one-way wave equation migration, Kirchhoff, or beam migration methods. Cost effective methods for making CAGs based on the advanced RTM technology will be useful for improving the efficiency of the subsurface analysis.

In some cases, seismic full waveform inversion (FWI) can be used to build a velocity model for RTM. FWI is an iterative optimizing process which minimizes the error between observed data and modeled data. Conventional FWI commonly uses the gradient- or steepest-descent based method. In some cases, local minima and highly non-linear effect may be issues for this method. Therefore, a successful application of FWI may depend on the following factors: low frequency information, good starting model, and long offset data. Among them, low frequency information and long-offset data are may be associated with the data acquisition phase while the starting model may be associated with the data processing phase. If there is an absence of low frequency components in observed data and limited offset range, then a good starting velocity model, which depicts background velocity well, may be used to remedy these issues. Therefore, reconstructing background velocity (long wavelength velocity) is one of important factors for the FWI application.

Approaches to reconstruct long wavelength velocity model may include: using a large damping coefficient to generate extremely low frequency information, taking envelope information from the signal by using Hilbert transform, and adopting the wavefield decomposition method to suppress back-scattered noises. Separating the gradient direction into tomography term and migration term and enhancing the intrinsic tomography term of the gradient direction can help to recover long wavelength structures. In some cases, wavenumber filtering based on the scattering angle analysis can be used. During the inversion process, the velocity model with the different scale is selectively updated by the angle-domain wavenumber filter from large to small scale. Gradual relaxation of the scattering angle can make the velocity model to be approached in a more stable and accurate way and avoids falling into local minima.

In some cases, Azimuth and Angle Dependent FWI (AADFWI) can be used to decompose forward and backward wavefields into angle domain as well as spatial and temporal domain by using optical flow. By not avoiding performing the transformation calculation, for example the Hilbert transform, this approach can reduce overhead in computation and be more applicable in 3-Dimensional (3D) applications. Optical flow is used to determine each vector of the wavefields with respect to each direction. The subsurface azimuth and reflection angle between both wavefields can then be computed. The new gradient direction compensates long wavelength information that evanesces when the reflection-dominant data is given without low frequency components. Using a large reflection angle helps to recover long wavelength structures, and relieve cycle skipping and migration footprints in the gradient direction of the FWI. Once the long wavelength structure is retrieved, the angle range can be relaxed so that FWI can concentrate on short wavelength structures. Accordingly, a high resolution velocity model can be obtained.

FIG. 1 (including FIGS. 1A and 1B) illustrates subsurface images, according to an implementation. FIGS. 1A and 1B include example CAGS 102 at different crosslines (xlines), an image 104 representing stacked sections with respect to the angle from 0 to 30 degrees, and an image 106 representing stacked sections with respect to the angle from 70 to 90 degrees. Stacked image by large reflection angle as shown in image 106 is artefacts in RTM. However, forward and backward propagated wavefields, which are correlated to generate such an image, are traveling through the same direction and containing long wavelength information. Thus, this information should be retained in FWI to recover long wavelength structures.

Figure 2:
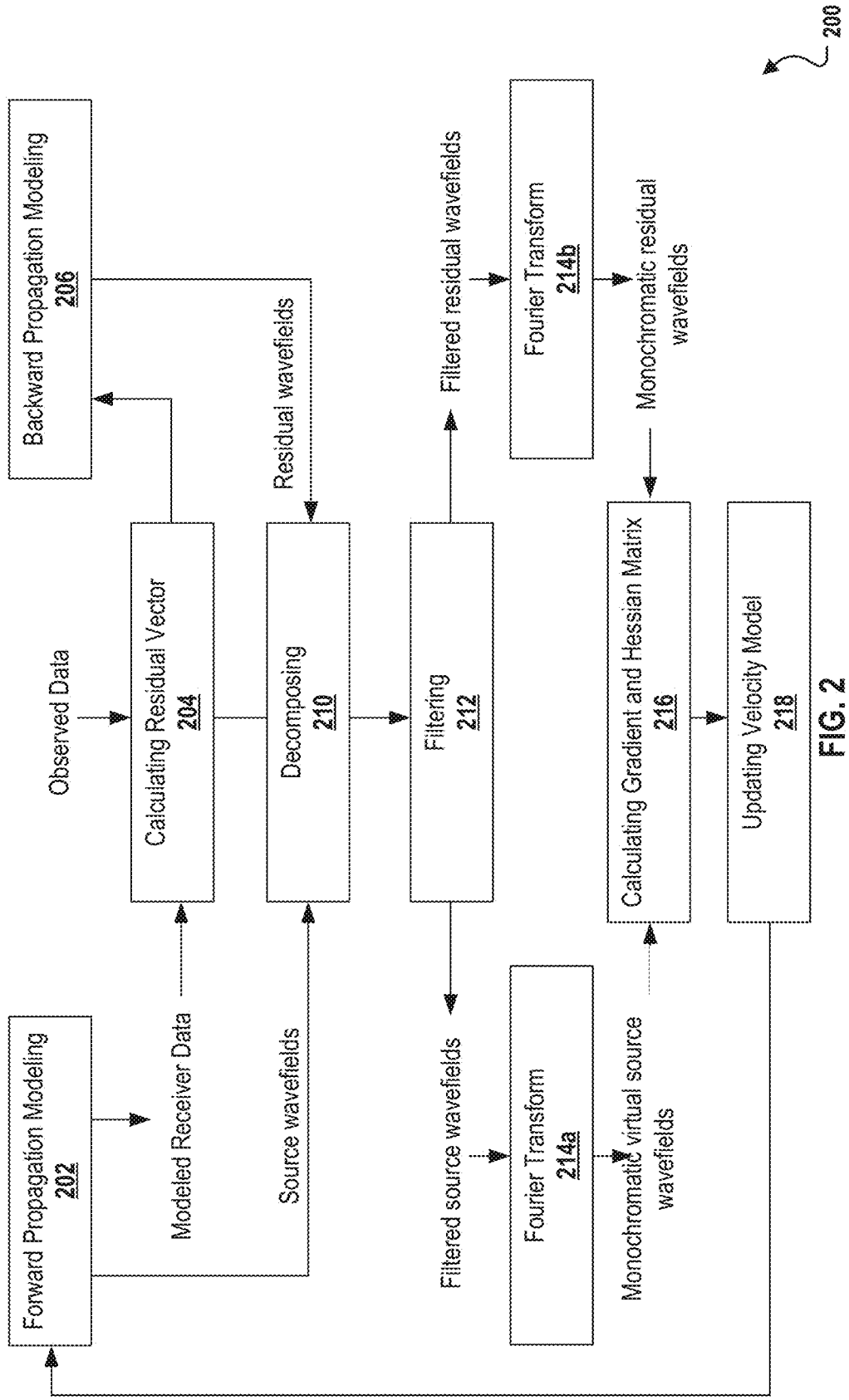
FIG. 2 illustrates an example velocity model generating process using the AADFWI algorithm, according to an implementation

FIG. 2 illustrates an example velocity model generating process 200 using the AADFWI algorithm, according to an implementation. For clarity of presentation, the description that follows generally describes process 200 in the context of FIGS. 1 and 3-9. However, it will be understood that process 200 may be performed, for example, by any other suitable system, environment, software, and hardware, or a combination of systems, environments, software, and hardware, as appropriate. In some cases, the process 200 can be executed on large scale computer clusters, super computers, or any other computing device or collection of computing devices. In some implementations, various steps of process 200 can be run in parallel, in combination, in loops, and/or in any order.

At 202, forward time-domain propagation modeling is performed on the source signal data. The source signal data includes sample data of the source signal, that is transmitted into the subsurface of a geographic area by a source device. In some cases, source signal data are recordings of the source wavelets generated by the source device. Alternatively or in combination, source signal data can be computer-generated source excitation using mathematical functions, for example, Ricker wavelet functions, or other simulations and approximations of the source signal. During a forward time-domain propagation modeling process, a plurality of source wavefields from the source location to a receiver location are calculated using the source signal data and an initial velocity model. In one example of the initial velocity model, the velocity at a location point can increase linearly with the depth of the location point. Other examples of the initial velocity model can be obtained based on other assumptions or derivation process. Each source wavefield that corresponds to a particular time step and a particular location between the source location and the receiver location, can be calculated. The source wavefield that corresponds to the receiver location is referred to as modeled receiver data At 204, a residual vector is computed. The residual vector can be computed by comparing the modeled receiver data and observed data. The observed data can be time-domain samples of receiver signal data that are received by a receiver device at the receiver location.

At 206, backward time-domain propagation modeling is performed on the residual vector. In FWI, residual vector is used as a source to generate backward wavefields. For example, during the backward time-domain propagation modeling process, a plurality of residual wavefields from the receiver location to source location are calculated using the residual vector and the initial velocity model. Each residual wavefield corresponds to a particular time step and a particular location between the receiver location and the source location.

At 210, the source wavefields and the residual wavefields are decomposed using optical flow. The source wavefields and the residual wavefields can be decomposed into subsurface azimuth and reflection angle domain, and temporal and spatial domain.

By applying optical flow to the source wavefields and the residual wavefields, the motion vectors of each wavefields at each time step can be obtained. These motion vectors represent instantaneous wave propagation at the respective time step. Angels between these vectors can be computed by calculating a dot product of the vectors. For a 2-dimensional (2D) analysis, the dot product of the 2 vectors on the x- and z-axis, respectively, is calculated. For a 3-D analysis, the dot product of 3 vectors, on the x-, y-, and z-axis, respectively, is calculated.

The following is an example optical flow equation to calculate a motion vector M:

$$D_x u_x + D_y u_y + D_z u_z + D_t = 0, \quad (1)$$

Where $$D_i = \frac{\partial P}{\partial i} \quad (i \in \{x, y, z, t\}) \quad (2)$$

Here, $D_i$ indicates partial derivative of a wavefield P with respect to each propagation direction and time, u denotes vectors for each direction which is a solution of this problem $M(u_x, u_y, u_z)$. By adopting Horn and Schunck (HS) to solve equation (1), the solution becomes an optimization process that minimizes the objective function C as follow:

$$C = \int_\Omega [(D_x u_x + D_y u_y + D_z u_z + D_t)^2 + \alpha^2 (\|\nabla u_x\|^2 + \|\nabla u_y\|^2 + \|\nabla u_z\|^2)] d\Omega \quad (3)$$

Where $$\|\nabla\|^2 = \sum_i \left(\frac{\partial}{\partial i}\right)^2 \quad (i \in \{x, y, z\}), \quad (4)$$

and $\alpha$ is a weighting factor. Then it gives iterative solution as $$u_i^{n+1} = \bar{u}_i^n - \frac{D_i(D_x \bar{u}_x^n + D_y \bar{u}_y^n + D_z \bar{u}_z^n + D_t)}{\alpha^2 + (D_x)^2 + (D_y)^2 + (D_z)^2}, \quad (5)$$

where the over-bar sign denotes a weighted average value obtained by neighboring points from the Laplacian operator.

Finally, the subsurface reflection angle $\theta_{ref}$ and the subsurface azimuth angle $\varphi_{ref}$ between two wavefields at a single point are computed by $$\theta_{ref} = \frac{1}{2}\theta_o = \frac{1}{2}\cos^{-1}\left(\frac{p_s \cdot p_r}{|p_s||p_r|}\right) \quad (6)$$

and $$\varphi_{ref} = \cos^{-1}\left(\frac{(p_s \times p_r) \cdot (n_x \times (p_s + p_r))}{|p_s \times p_r||n_x \times (p_s + p_r)|}\right),$$

where p indicates source wavefields and residual wavefields, respectively, expressed by subscripts s and r, $\theta_o$ is opening angle between two vectors, and $n_x$ is a unit vector on x-axis which is (1, 0, 0).

Figure 3:
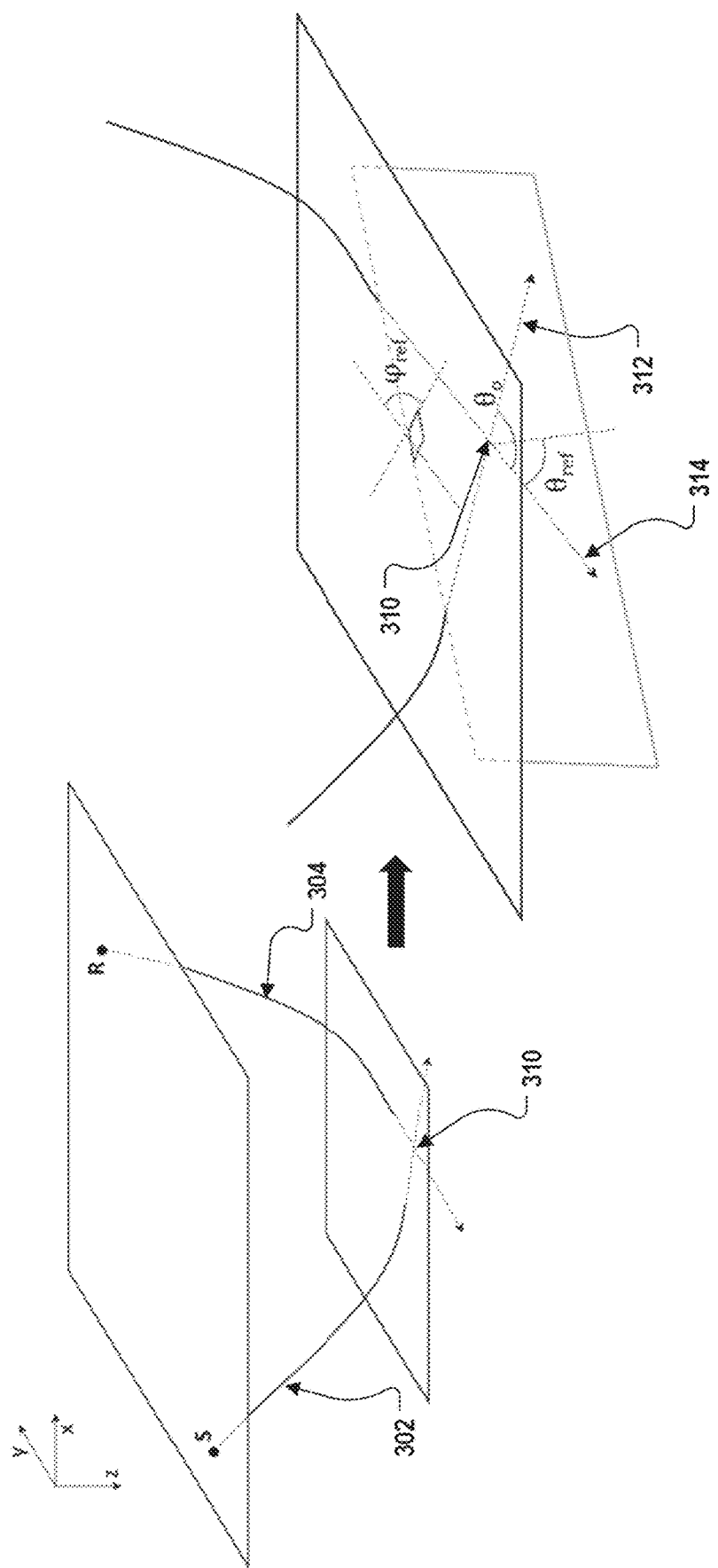
FIG. 3 is a scheme diagram illustrating calculating the reflection angle, according to an implementation.

FIG. 3 is a scheme diagram illustrating calculating the reflection angle, according to an implementation. As shown in FIG. 3, source wavefields along the forward path 302 from the source location (denoted as "S") to the receive location (denoted as "R") are calculated. Similarly, residual wavefields along the backward path 304 from the receiver location to the source location are also calculated. The location 310 represents a location that is one both the forward path 302 and the backward path 304.

As shown in the enlarged view on the right, a source vector 312 that is obtained based on the source wavefield at the location 310, and a residual vector 314 that is obtained based on the residual wavefield at the location 310, correspond to the same location 310. The subsurface reflection angle $\theta_{ref}$ and the subsurface azimuth angle $\varphi_{ref}$ can be calculated using equation (6), where $p_s$ is substituted by the source vector 312, and $p_r$ is substituted by the residual vector 314.

Returning to FIG. 2, the gradient direction of FWI can be obtained by the correlation between forward (source) and backward (residual) propagated wavefields as follows:

$$\frac{\partial C(m)}{\partial v} = \int_T \frac{2}{v^3} \frac{\partial^2}{\partial t^2} p_s(x, t) p_r(x, t) dt, \quad (7)$$

where C is the objective function of FWI and v denotes velocity. Equation (7) can also be expressed in the angle domain approach:

$$\frac{\partial C(m)}{\partial v} = \int_T \int_{\theta_s} \int_{\theta_r} \frac{2}{v^3} \frac{\partial^2}{\partial t^2} p_s(x, t, \theta_{ref}, \varphi_{ref}) p_r(x, t, \theta_{ref}, \varphi_{ref}) d\theta d\varphi dt. \quad (8)$$

At 212, the source wavefields and the residual wavefields are filtered. The conventional gradient direction in equation 7 and its decomposed form in equation 8 can be calculated by using correlation of the forward and backward wavefields on every single point at each time step. In order to extract long wavelength information from those equations, a filter for angle filtering can be used. The filter for AADFWI can be expressed as:

$$\frac{\partial C_{new}(m)}{\partial v} = \int_T \int_\varphi \int_\theta W(\theta_{ref}, \varphi_{ref}, t) \frac{2}{v^3} \quad (9)$$
$$\frac{\partial^2}{\partial t^2} p_s(x, t, \theta_{ref}, \varphi_{ref}) p_r(x, t, \theta_{ref}, \varphi_{ref}) d\theta d\varphi dt,$$

where $$W(\theta_{ref}, \varphi_{ref}, t) = \begin{cases} 1, & \theta_1 < \theta_{ref} \le \theta_2 \text{ and } \varphi_1 < \varphi_{ref} \le \varphi_2 \\ 0, & \text{else} \end{cases}, \quad (10)$$

and the subscripts 1 and 2 denote the minimum and maximum angles in scope. For convenience, equation 9 can be rewritten as:

$$\frac{\partial C_{new}(m)}{\partial v} = \int_T \int_\varphi \int_\theta W(\theta_{ref}, \varphi_{ref}, t) G(x, t, \theta_{ref}, \varphi_{ref}) d\theta d\varphi dt, \quad (11)$$

where $$G(x, t, \theta_{ref}, \varphi_{ref}) = \frac{2}{v^3} \frac{\partial^2}{\partial t^2} p_s(x, t, \theta_{ref}, \varphi_{ref}) p_r(x, t, \theta_{ref}, \varphi_{ref}). \quad (12)$$

At 214a, a Fourier transform is performed on the filtered source wavefields to obtain the monochromatic virtual source wavefields with respect to a set of frequency components. Similarly, at 214b, a Fourier transform is performed on the filtered residual wavefields to obtain the monochromatic residual wavefields with respect to the set of frequency components. The set of frequency components can be selected to target the frequency ranges to be analyzed in the FWI process.

Figure 4:
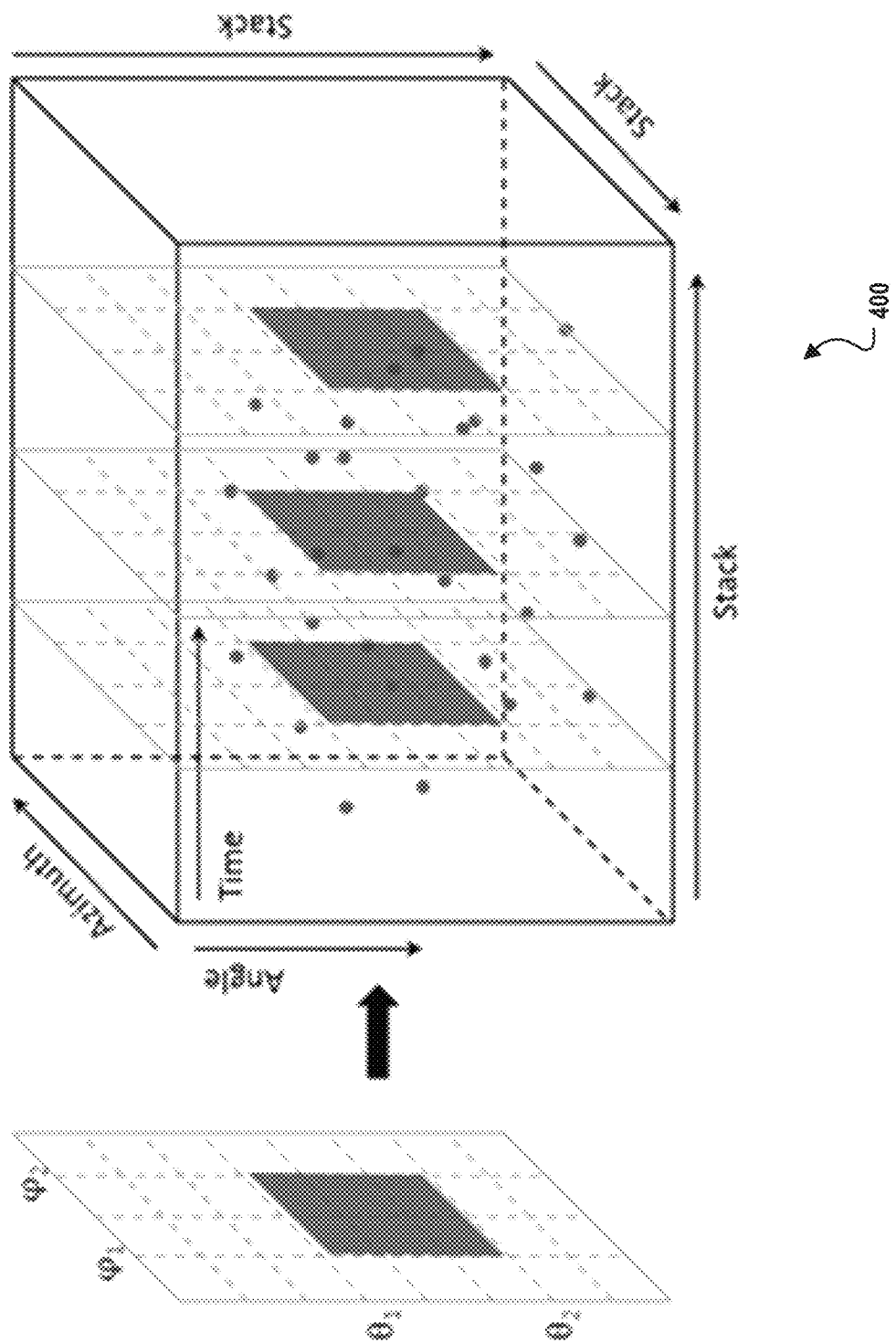
FIG. 4 is a scheme diagram illustrating applying subsurface azimuth and reflection angle filtering during the inversion process, according to an implementation FIG. 5 (including FIGS. 5A, 5B, and 5C) illustrate example sensitivity kernels for gradient directions, according to an implementation

At 216, the gradient direction and Hessian matrix are computed based on the filtered wavefields. FIG. 4 is a scheme diagram 400 illustrating applying azimuth and angle filtering during the inversion process, according to an implementation. Red dot indicates the value obtained by equation 12. When stacking for all axis, the cube reduces in a single point of the conventional gradient direction cube. If the filter is applied for a range of angles (subsurface reflection angles), for example between $\theta_1$ and $\theta_2$, and azimuths (subsurface azimuth angles), for example between $\varphi_1$ and $\varphi_2$, then only gradients within this range of the filter are stacked for each time step to generate the gradient direction, zeroes are padded for values outside of the range of the filters. The Hessian matrix can be calculated by auto-correlating the virtual source wavefields.

At 218, the velocity model is updated by the filtered gradient direction. The process 200 returns to 202, where forward progation modeling is performed based on the updated velocity model. In each iteration, different range of filtering can selected. At the early stage of FWI, the gradient direction is concentrated on long wavelength structures and becomes focusing on high-resolution structures through relieving the filtering range. For example, the filtering range can be focused on large angle information such as 70-90 degrees in an early iteration. After retrieving the long wave length structures, the filtering range can be set to smaller angles such as 0-30 degrees in a later iteration.

Figure 5A:
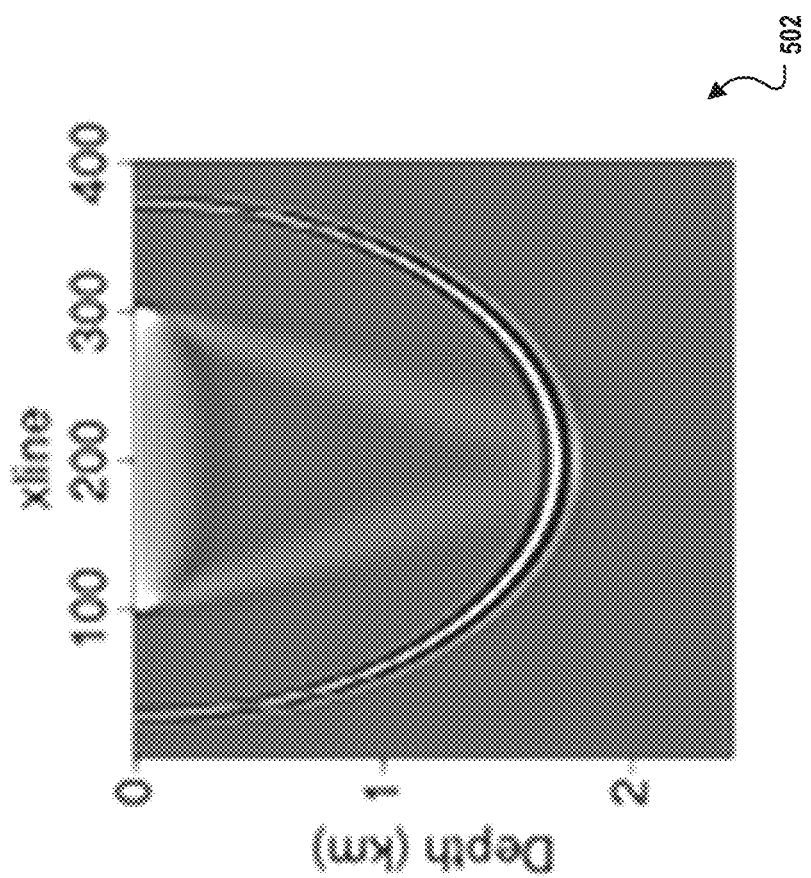
Figure 5B:
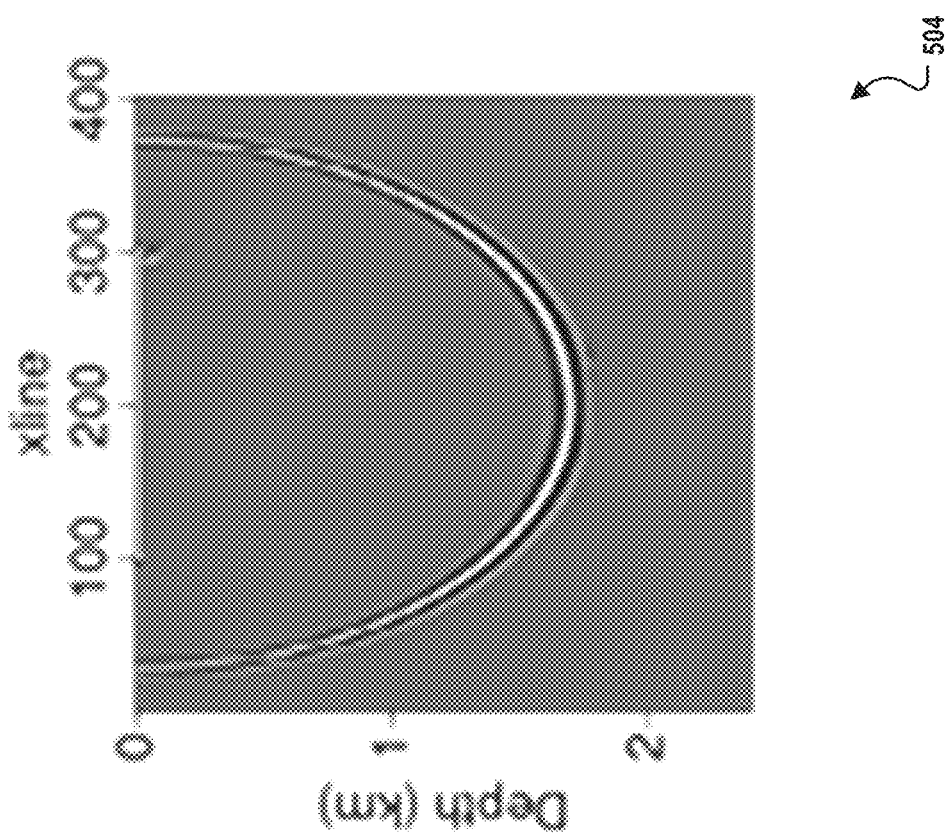
Figure 5C:
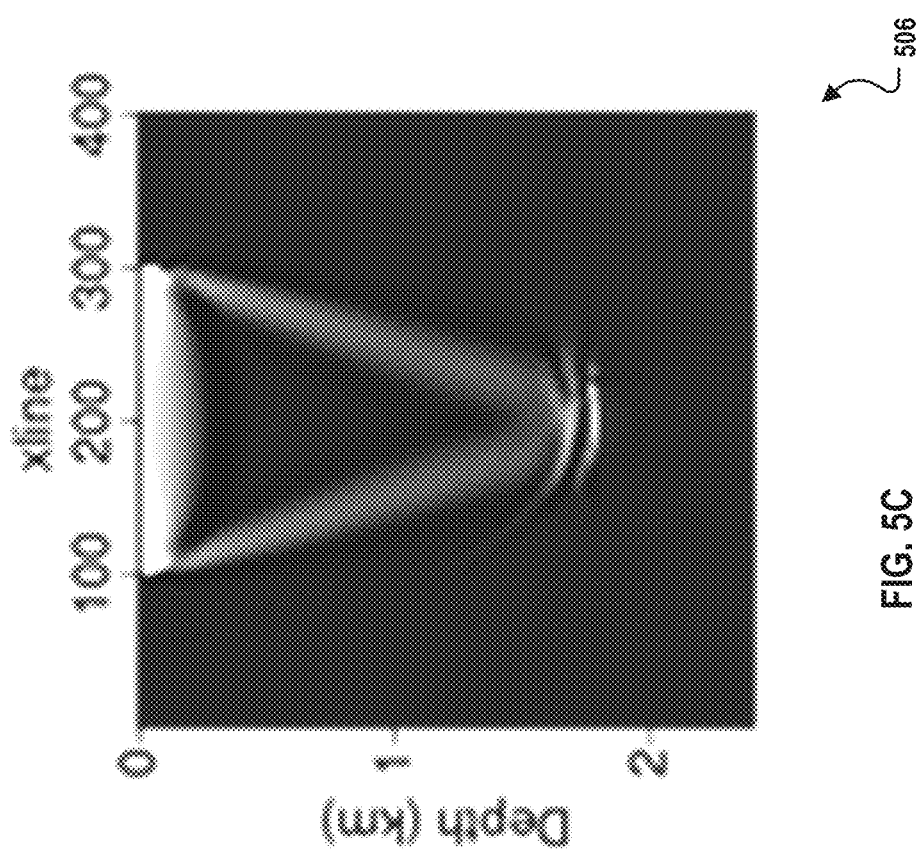

FIG. 5 (including FIGS. 5A, 5B, and 5C) illustrates example sensitivity kernels for gradient directions, according to an implementation. In a FWI, a sensitivity kernel describes how the model parameter is perturbed in the earth model with respect to data residual changes. Because the sensitivity kernel includes both low- and high wavenumbers (long and short wavelength) in the conventional gradient direction, FWI process tends to invert both simultaneously. The result usually suffers from RTM footprints from the high wavenumber components, and the solution may be stuck in local minima when the initial guess is not adequate. Angle filtering, described previously, can be regarded as a sensitivity kernel decomposition. In the conventional gradient direction, because high wavenumber structures are concentrated on migration terms in the gradient direction, which are usually much stronger than tomography terms in reflection dominant data, it may be difficult to update background velocity. FIGS. 5A-5C include images 502, 504, and 506. The image 502 represents a full sensitivity kernel. The full kernel contains both migration and tomographic terms. The migration term includes high wavenumber components and the tomographic term includes low wavenumber components. The reconstruction of tomography term is important for successful FWI applications. The image 504 is obtained by setting $\theta 1$ and $\theta 2$ to be 0 and 40 in applying the azimuth and angle filtering discussed previously. The image 506 is obtained by setting $\theta 1$ and $\theta 2$ to be 40 and 90 in applying the azimuth and angle filtering discussed previously. As illustrated, the sensitivity kernel is separated by migration terms shown in the image 504 and the tomography terms shown in the image 506.

In some cases, instead of using filtering as discussed previously, weighting function which attenuates the values with respect to the azimuth and angle can be used. In this cases, the process 200 may skip 212 and applying weighting function in calculating gradient and Hessian matrix at 216 and the velocity model is updated by the weighted gradient direction at 218.

Applying variable weighting to equation 11, the equation can be rewritten as:

$$\frac{\partial C_v(m)}{\partial v} = \int_T \int_\varphi \int_\theta W_v(\theta_{ref}, \varphi_{ref}, t) G(x, t, \theta_{ref}, \varphi_{ref}) d\theta d\varphi dt, \quad (13)$$

where $$W_v(\theta_{ref}, \varphi_{ref}, t) = \quad (14)$$
$$\begin{cases} w_1, & \theta_1 < \theta_{ref} \le \theta_2 \\ w_2, & \theta_2 < \theta_{ref} \le \theta_3 \\ \vdots & \vdots \\ \vdots & \vdots \\ w_n, & \theta_n < \theta_{ref} \le \theta_{n+1} \end{cases}, \left(0 \le \theta_i \le \frac{\pi}{2}, i = 1, 2, \ldots, n\right)$$

Omitting ranging for azimuth for convenience, equation 13 can be rewritten as:

$$\frac{\partial C_v(m)}{\partial v} = w_1 G_1(x) + w_2 G_2(x) + \ldots + w_n G_n(x), \quad (15)$$

where $$G_i(x) = \int_T \int_\varphi \int_{\theta_i}^{\theta_{i+1}} G(x, t, \theta_{ref}, \varphi_{ref}) d\theta d\varphi dt, \quad (16)$$

$(i = 1, 2, \ldots, n).$

Figure 6:
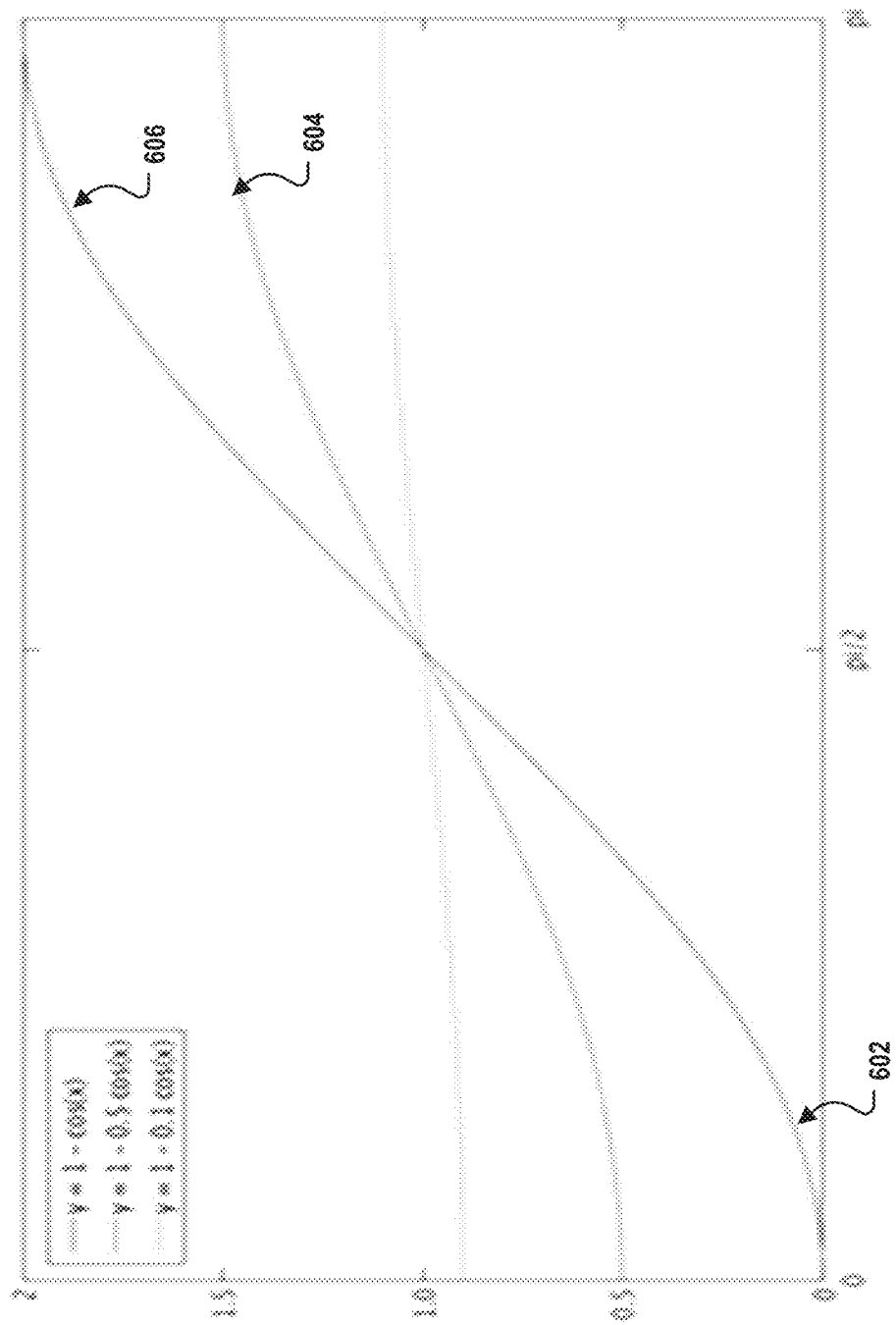
FIG. 6 illustrates example weighting functions, according to an implementation.
Figure 7A:
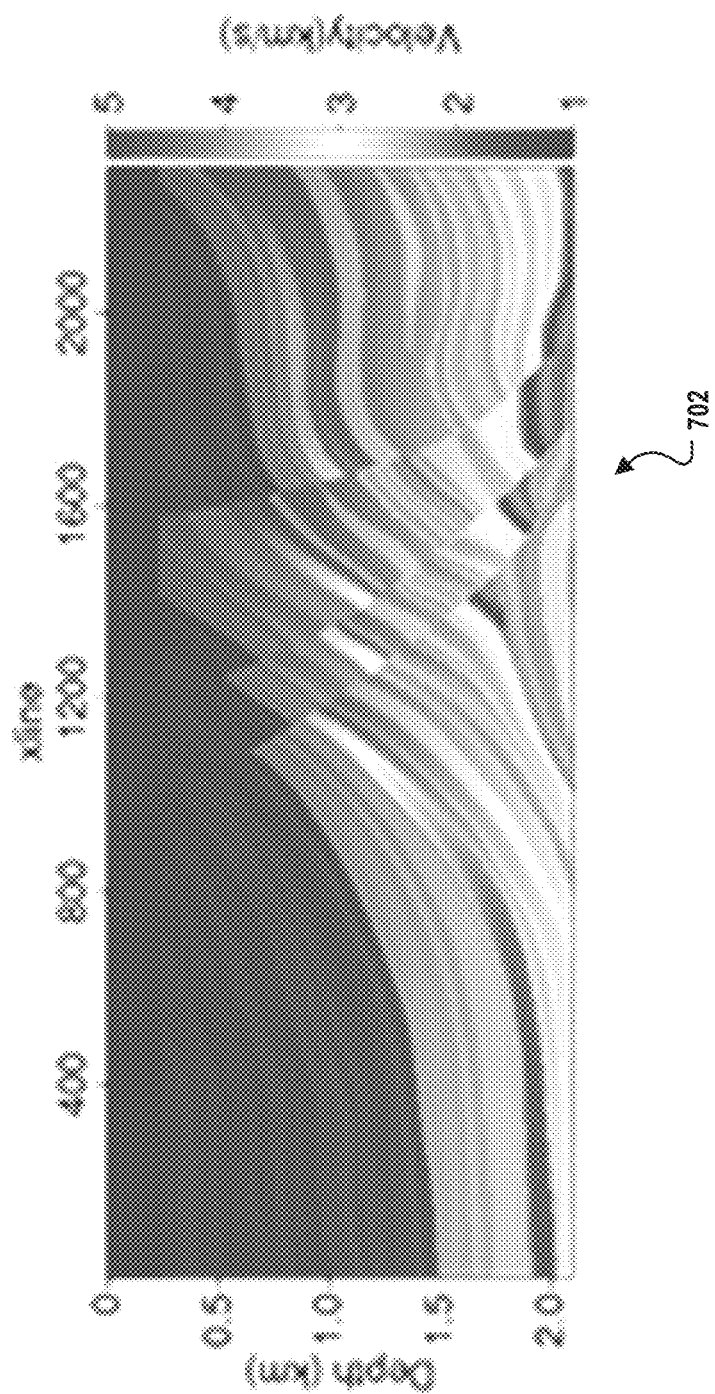
FIG. 7 (including FIGS. 7A, 7B, 7C, and 7D) illustrates an example numerical test of AADFWI, according to an implementation.
Figure 7B:
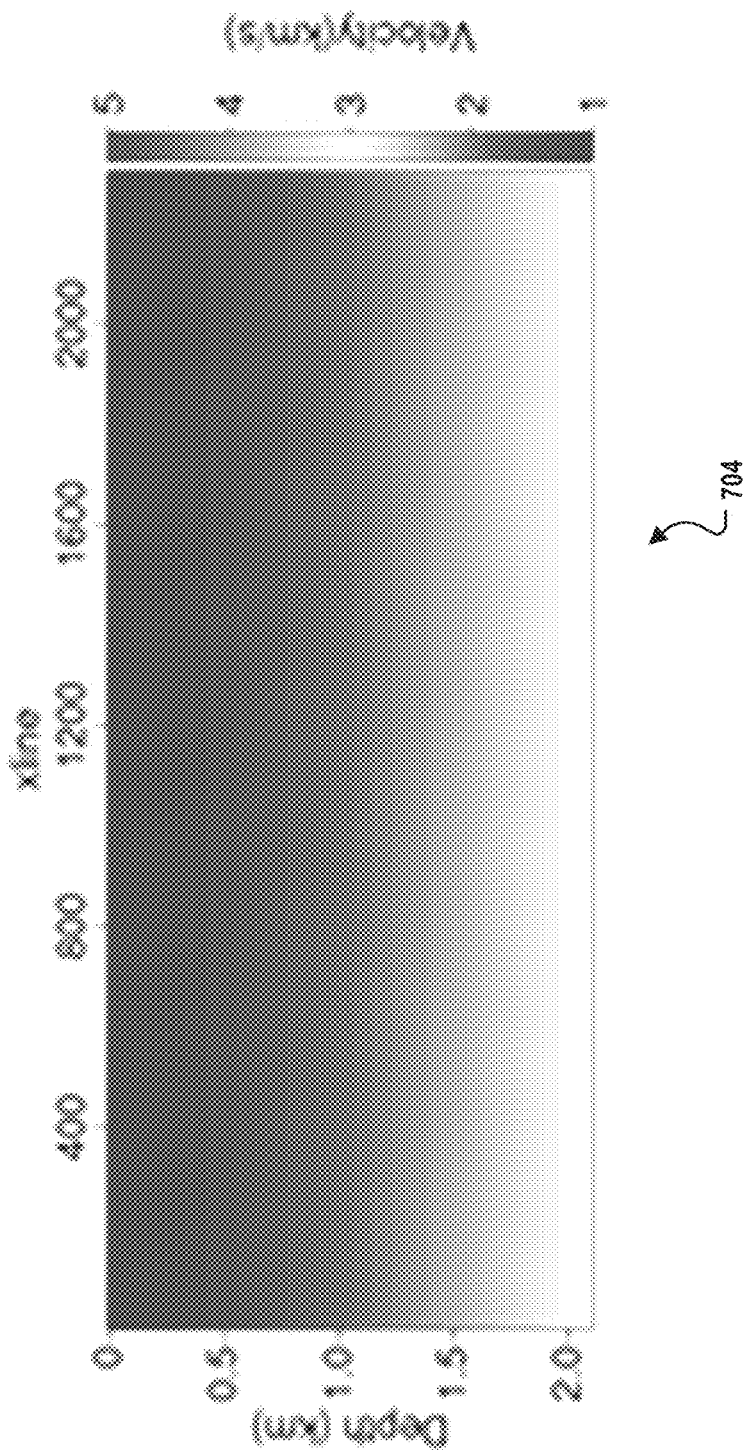
Figure 7C:
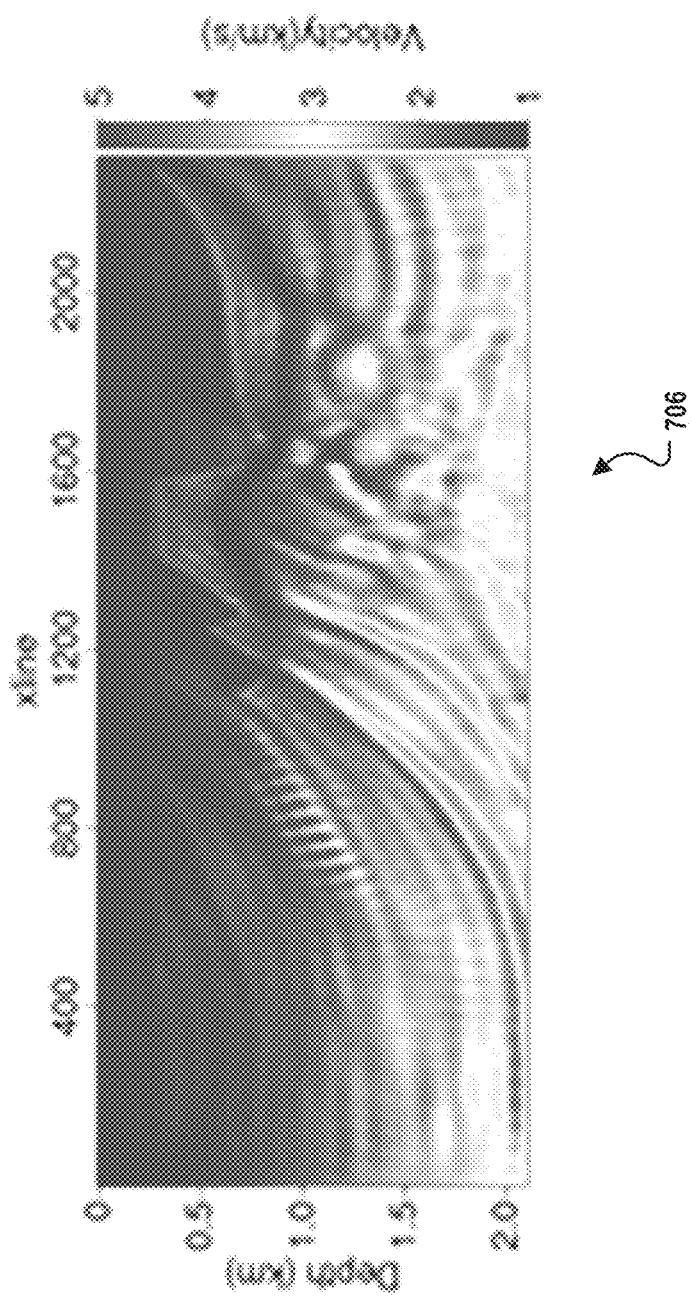
Figure 7D:
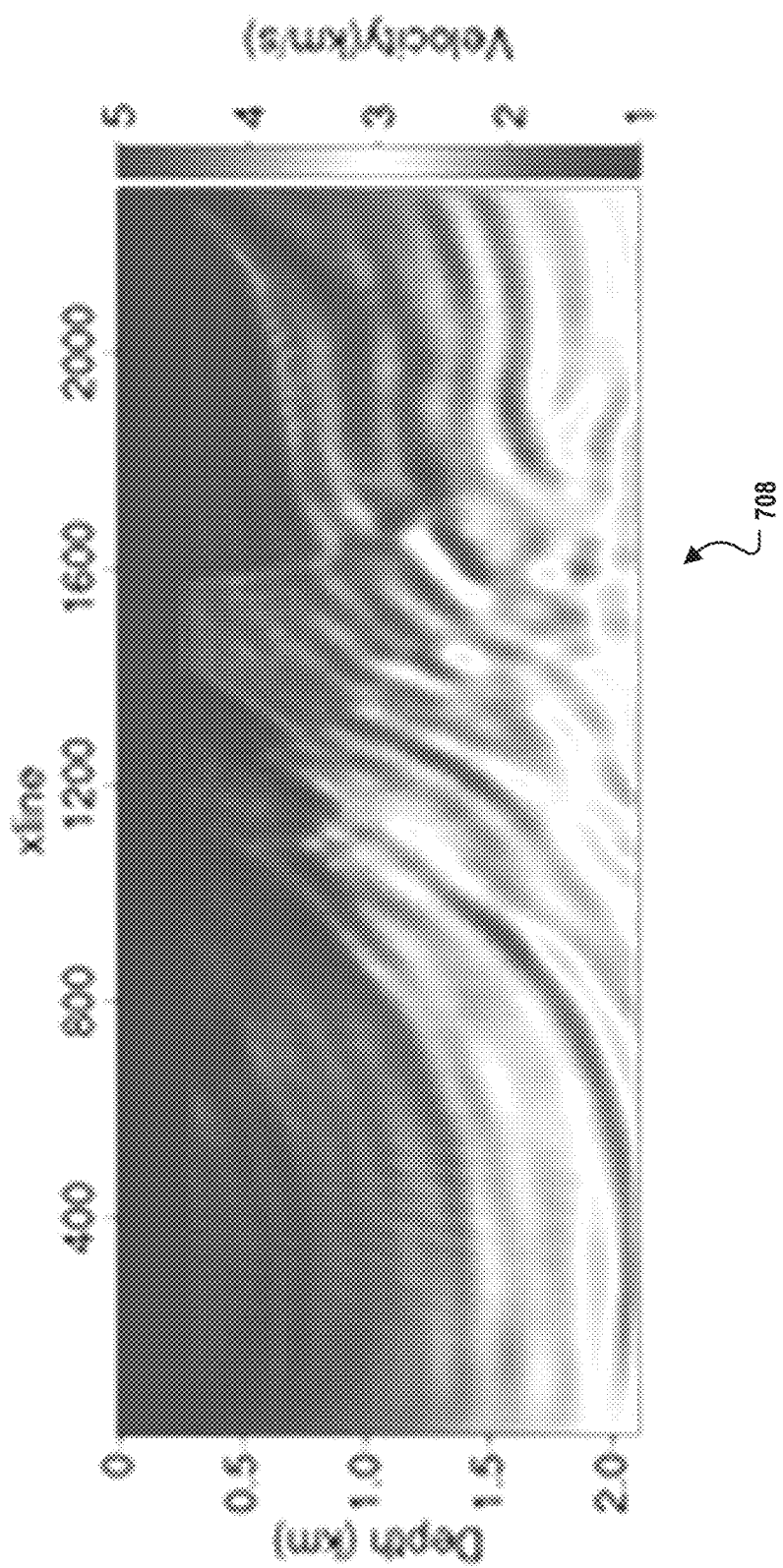

Equations 13 to 16 show that the gradient direction for each angle range can be respectively weighted by weighting factors $w_1, w_2 \ldots w_n$. When the weighting factors are set to 1, the result degenerates to the conventional gradient direction. FIG. 6 illustrates example weighting functions 602, 604, and 606, according to an implementation. The weighting function can be expressed as:

$$y = 1 - a \cos(x) \quad (17)$$

where a represents the coefficient for the cosine function. a is set to 1 for weighting function 602, where large reflection angles are weighted more and small angles are attenuated. a is reduced as the iteration goes on to give the similar weighting with respect to all ranges of the angle. For example, a becomes 0.5 and 0.1 as represented by the weighting functions 604 and 606, respectively. Finally, the computed gradient direction from this weighting function becomes the same with the conventional one as a reaches 0 or close to 0.

In some cases, the weighting function can be used in addition to the filtering process. For example, instead of padding zeros for wavefields outside of the filtered range, weighting factors can be used. The values of the weighting factors can be attenuated gradually to approach zero for wavefields outside of the filtered range.

FIG. 7 (including FIGS. 7A, 7B, 7C, and 7D) illustrates an example numerical test of AADFWI according to an implementation. Here, the synthetic Marmousi model is used and the water layer is added from the original model. Time domain finite difference modeling has been used to generate synthetic shot gathers for observed data, and 192 sources are used with Ricker wavelet which has a dominant frequency on 10 Hz. The maximum offset is 6 km. A Time-Frequency-Hybrid domain algorithm is employed with 9 discrete frequencies ranging from 5 to 8 Hz for the inversion process. The source wavelet is estimated for each shot and each frequency. FIGS. 7A-7D include graphs 702, 704, 706, and 708. The graph 702 represents the true model. The graph 704 represents the initial model. For the initial guess of velocity, gradually increasing velocity in depth is employed. The graph 706 represents the FWI results without using filtering. As shown in the graph 706, severe cycle skipping noise and local minima can be observed due to lack of low frequency component and the poor initial model. The graph 708 represents the FWI results using AADFWI described previously. More stable and accurate results without cycle skipping and noises can be observed. In this example, the angle filtering method is used which weights the gradient by padding zero to the angle not in scope. At the early stage of iteration, AADFWI has used only large angles, then the minimum angle is relaxed as iteration goes on. When a poor initial model and a lack of low frequency are present, AADFWI gives more robust inversion result while conventional one suffers from cycle skipping.

Figure 8:
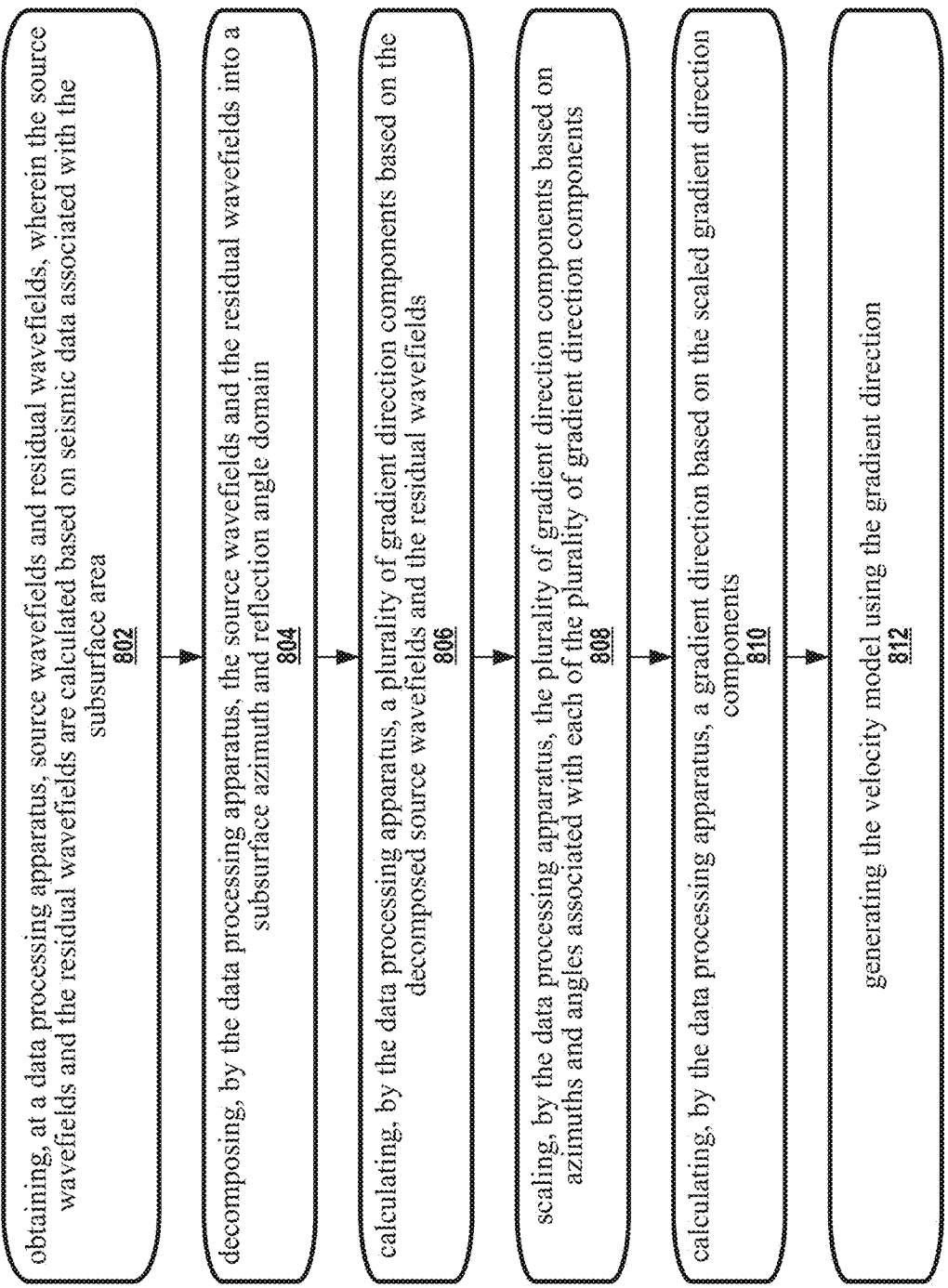
FIG. 8 illustrates an example velocity model generating process, according to an implementation.

FIG. 8 illustrates an example velocity model generating process 800, according to an implementation. For clarity of presentation, the description that follows generally describes process 800 in the context of FIGS. 1-7 and 9. However, it will be understood that process 800 may be performed, for example, by any other suitable system, environment, software, and hardware, or a combination of systems, environments, software, and hardware, as appropriate. In some cases, the process 800 can be executed on a large scale computer cluster, super computers, or any other computing device or collection of computing devices. In some implementations, various steps of process 800 can be run in parallel, in combination, in loops, and/or in any order.

At 802, source wavefields and residual wavefields are obtained at a data processing apparatus. The source wavefields and residual wavefields are calculated based on seismic data associated with a subsurface region. The seismic data includes receiver signal data and source signal data.

At 804, the source wavefields and the residual wavefields are decomposed into a subsurface azimuth and reflection angle domain using an optical flow process. In some cases, the decomposition is performed based on equations (5) and (6).

At 806, a plurality of gradient direction components are calculated based on the source wavefields and the residual wavefields. In some cases, the plurality of gradient direction components are calculated based on equation (12).

At 808, each of the plurality of gradient direction components is scaled based on azimuths and angles associated with the respective gradient direction component. In some cases, the scaling can be performed using a filtering process based on equation (10). Alternatively, the scaling can be performed using a weighting function based on equation (15).

At 810, a gradient direction is calculated based on the scaled gradient direction components. At 812, a velocity model of the subsurface region is generated based on the gradient direction. In some cases, the velocity model can be updated in an iterative process. The finalized velocity model can be used to generate subsurface image. The subsurface image can be used to provide better understanding of the subsurface structure and improve the efficiency of a hydrocarbon exploration or production operation in the geographic area.

Figure 9:
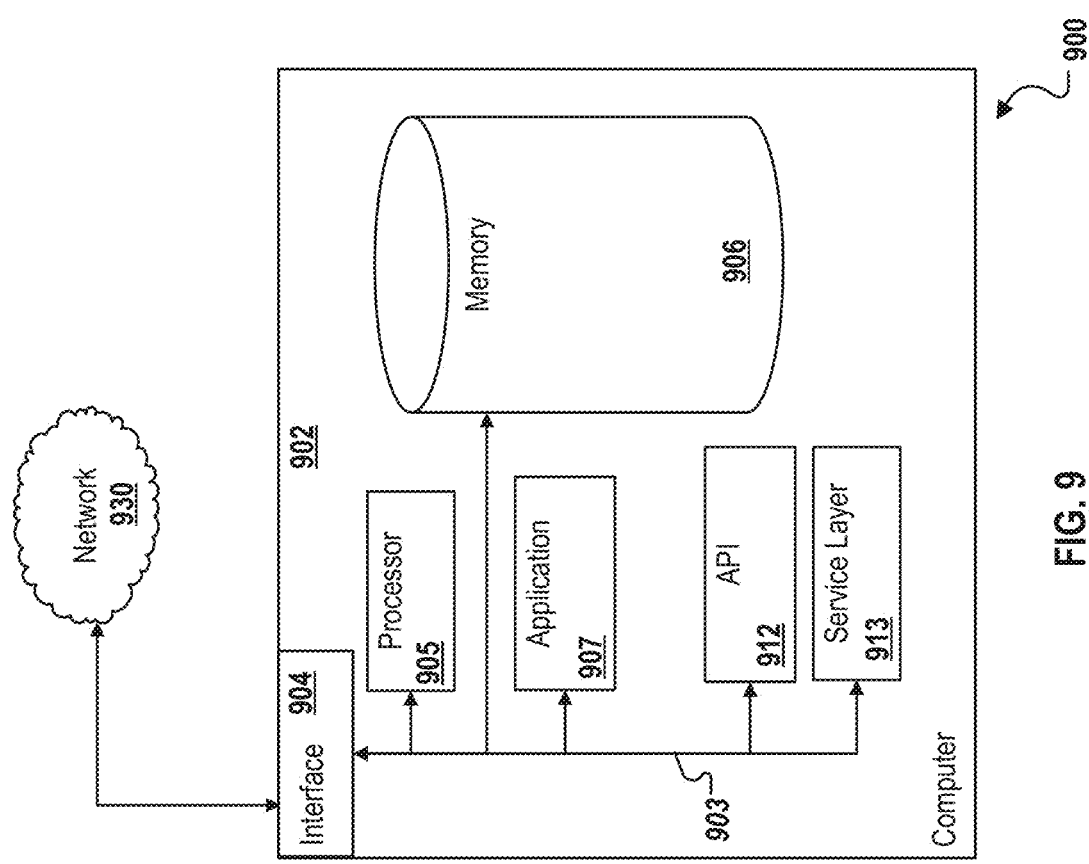
FIG. 9 is a high level architecture block diagram of a geophysical imaging system, according to an implementation.

FIG. 9 is a high level architecture block diagram of a geophysical imaging system 900 that generates a velocity model based on the methods described herein, according to an implementation. At a high level, the illustrated system 900 includes a geophysical image processing computer 902 coupled with a network 930.

The described illustration is only one possible implementation of the described subject matter and is not intended to limit the disclosure to the single described implementation. Those of ordinary skill in the art will appreciate the fact that the described components can be connected, combined, and/or used in alternative ways, consistent with this disclosure.

The network 930 facilitates communication between the computer 902 and other components, for example, components that obtain observed data for a location and transmit the observed data to the computer 902. The network 930 can be a wireless or a wireline network. The network 930 can also be a memory pipe, a hardware connection, or any internal or external communication paths between the components.

The computer 902 includes a computing system configured to perform the method as described herein. In some cases, the algorithm of the method can be implemented in an executable computing code, e.g., C/C++ executable codes. In some cases, the computer 902 can include a standalone Linux system that runs batch applications. In some cases, the computer 902 can include mobile or personal computers that have sufficient memory size to process each block of the geophysical data.

The computer 902 may comprise a computer that includes an input device, such as a keypad, keyboard, touch screen, microphone, speech recognition device, other devices that can accept user information, and/or an output device that conveys information associated with the operation of the computer 902, including digital data, visual and/or audio information, or a GUI.

The computer 902 can serve as a client, network component, a server, a database, or other persistency, and/or any other component of the system 900. In some implementations, one or more components of the computer 902 may be configured to operate within a cloud-computing-based environment.

At a high level, the computer 902 is an electronic computing device operable to receive, transmit, process, store, or manage data and information associated with the system 900. According to some implementations, the computer 902 may also include, or be communicably coupled with, an application server, e-mail server, web server, caching server, streaming data server, business intelligence (BI) server, and/or other server.

The computer 902 can receive requests over network 930 from a client application (e.g., executing on another computer 902) and respond to the received requests by processing said requests in an appropriate software application. In addition, requests may also be sent to the computer 902 from internal users (e.g., from a command console or by another appropriate access method), external or third parties, other automated applications, as well as any other appropriate entities, individuals, systems, or computers.

Each of the components of the computer 902 can communicate using a system bus 903. In some implementations, any and/or all the components of the computer 902, both hardware and/or software, may interface with each other and/or the interface 904, over the system bus 903, using an application programming interface (API) 912 and/or a service layer 913. The API 912 may include specifications for routines, data structures, and object classes. The API 912 may be either computer language-independent or -dependent and refer to a complete interface, a single function, or even a set of APIs. The service layer 913 provides software services to the computer 902 and/or the system 900. The functionality of the computer 902 may be accessible for all service consumers using this service layer. Software services, such as those provided by the service layer 913, provide reusable, defined business functionalities, through a defined interface. For example, the interface may be software written in JAVA, C++, or other suitable language providing data in Extensible Markup Language (XML) format or other suitable format. While illustrated as an integrated component of the computer 902, alternative implementations may illustrate the API 912 and/or the service layer 913 as stand-alone components in relation to other components of the computer 902 and/or system 900. Moreover, any or all parts of the API 912 and/or the service layer 913 may be implemented as child or sub-modules of another software module, enterprise application, or hardware module, without departing from the scope of this disclosure.

The computer 902 includes an interface 904. Although illustrated as a single interface 904 in FIG. 9, two or more interfaces 904 may be used according to particular needs, desires, or particular implementations of the computer 902 and/or system 900. The interface 904 is used by the computer 902 for communicating with other systems in a distributed environment—including within the system 900—connected to the network 930 (whether illustrated or not). Generally, the interface 904 comprises logic encoded in software and/or hardware in a suitable combination and operable to communicate with the network 930. More specifically, the interface 904 may comprise software supporting one or more communication protocols associated with communications such that the network 930 or interface's hardware is operable to communicate physical signals within and outside of the illustrated system 900.

The computer 902 includes a processor 905. Although illustrated as a single processor 905 in FIG. 9, two or more processors may be used according to particular needs, desires, or particular implementations of the computer 902 and/or the system 900. Generally, the processor 905 executes instructions and manipulates data to perform the operations of the computer 902. Specifically, the processor 905 executes the functionality required for processing geophysical data.

The computer 902 also includes a memory 906 that holds data for the computer 902 and/or other components of the system 900. Although illustrated as a single memory 906 in FIG. 9, two or more memories may be used according to particular needs, desires, or particular implementations of the computer 902 and/or the system 900. While memory 906 is illustrated as an integral component of the computer 902, in alternative implementations, memory 906 can be external to the computer 902 and/or the system 900.

The application 907 is an algorithmic software engine providing functionality according to particular needs, desires, or particular implementations of the computer 902 and/or the system 900, particularly with respect to functionality required for processing geophysical data. For example, application 907 can serve as one or more components/applications described in FIGS. 1-8. Further, although illustrated as a single application 907, the application 907 may be implemented as multiple applications 907, on the computer 902. In addition, although illustrated as integral to the computer 902, in alternative implementations, the application 907 can be external to the computer 902 and/or the system 900.

There may be any number of computers 902 associated with, or external to, the system 900 and communicating over network 930. Further, the terms "client," "user," and other appropriate terminology may be used interchangeably, as appropriate, without departing from the scope of this disclosure. Moreover, this disclosure contemplates that many users may use one computer 902, or that one user may use multiple computers 902.

Described implementations of the subject matter can include one or more features, alone or in combination.

For example, in a first implementation, a computer-implemented method for generating a velocity model for a subsurface area, comprising: obtaining, at a data processing apparatus, source wavefields and residual wavefields, wherein the source wavefields and the residual wavefields are calculated based on seismic data associated with the subsurface area; decomposing, by the data processing apparatus, the source wavefields and the residual wavefields into a subsurface azimuth and reflection angle domain; calculating, by the data processing apparatus, a plurality of gradient direction components based on the decomposed source wavefields and the residual wavefields; scaling, by the data processing apparatus, the plurality of gradient direction components based on azimuths and angles associated with each of the plurality of gradient direction components; calculating, by the data processing apparatus, a gradient direction based on the scaled gradient direction components; and generating the velocity model using the gradient direction.

The foregoing and other described implementations can each, optionally, include one or more of the following features:

A first feature, combinable with any of the following features, the method further comprising: updating the velocity model using an iterative process, wherein a different scaling factor is used in each iteration of the iterative process.

A second feature, combinable with any of the previous or following features, wherein the iterative process includes a first iteration and a second iteration, a first scaling factor corresponding to a first angle is used in the first iteration, a second scaling factor corresponding to a second angle is used in the second iteration, and the first angle is larger than the second angle.

A third feature, combinable with any of the previous or following features, wherein the decomposing is performed using an optical flow process.

A fourth feature, combinable with any of the previous or following features, wherein the scaling comprises: applying a filter on the plurality of gradient direction components based on a range of azimuth and angle.

A fifth feature, combinable with any of the previous or following features, wherein the scaling comprises: applying a weighting function that weighs each of the plurality of gradient direction components with a respective weighting factor.

A sixth feature, combinable with any of the previous or following features, wherein the decomposing comprises calculating a reflection angle using the optical flow process.

In a second implementation, a non-transitory computer-readable medium storing instructions which, when executed, cause a computing device to perform operations comprising: obtaining, at a data processing apparatus, source wavefields and residual wavefields, wherein the source wavefields and the residual wavefields are calculated based on seismic data associated with the subsurface area; decomposing, by the data processing apparatus, the source wavefields and the residual wavefields into an azimuth and angle domain; calculating, by the data processing apparatus, a plurality of gradient direction components based on the decomposed source wavefields and the residual wavefields; scaling, by the data processing apparatus, the plurality of gradient direction components based on azimuths and angles associated with each of the plurality of gradient direction components; calculating, by the data processing apparatus, a gradient direction based on the scaled gradient direction components; and generating the velocity model using the gradient direction.

The foregoing and other described implementations can each, optionally, include one or more of the following features:

A first feature, combinable with any of the following features, the operations further comprising: updating the velocity model using an iterative process, wherein a different scaling factor is used in each iteration of the iterative process.

A second feature, combinable with any of the previous or following features, wherein the iterative process includes a first iteration and a second iteration, a first scaling factor corresponding to a first angle is used in the first iteration, a second scaling factor corresponding to a second angle is used in the second iteration, and the first angle is larger than the second angle.

A third feature, combinable with any of the previous or following features, wherein the decomposing is performed using an optical flow process.

A fourth feature, combinable with any of the previous or following features, wherein the scaling comprises: applying a filter on the plurality of gradient direction components based on a range of azimuth and angle.

A fifth feature, combinable with any of the previous or following features, wherein the scaling comprises: applying a weighting function that weighs each of the plurality of gradient direction components with a respective weighting factor.

A sixth feature, combinable with any of the previous or following features, wherein the decomposing comprises calculating a reflection angle using the optical flow process.

In a third implementation, a device comprising: at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising: obtaining source wavefields and residual wavefields, wherein the source wavefields and the residual wavefields are calculated based on seismic data associated with the subsurface area; decomposing the source wavefields and the residual wavefields into a subsurface azimuth and reflection angle domain; calculating a plurality of gradient direction components based on the decomposed source wavefields and the residual wavefields; scaling the plurality of gradient direction components based on azimuths and angles associated with each of the plurality of gradient direction components; calculating a gradient direction based on the scaled gradient direction components; and generating the velocity model using the gradient direction.

The foregoing and other described implementations can each, optionally, include one or more of the following features:

A first feature, combinable with any of the following features, the operations further comprising: updating the velocity model using an iterative process, wherein a different scaling factor is used in each iteration of the iterative process.

A second feature, combinable with any of the previous or following features, wherein the iterative process includes a first iteration and a second iteration, a first scaling factor corresponding to a first angle is used in the first iteration, a second scaling factor corresponding to a second angle is used in the second iteration, and the first angle is larger than the second angle.

A third feature, combinable with any of the previous or following features, wherein the decomposing is performed using an optical flow process.

A fourth feature, combinable with any of the previous or following features, wherein the scaling comprises: applying a filter on the plurality of gradient direction components based on a range of azimuth and angle.

A fifth feature, combinable with any of the previous or following features, wherein the scaling comprises: applying a weighting function that weighs each of the plurality of gradient direction components with a respective weighting factor.

A sixth feature, combinable with any of the previous or following features, wherein the decomposing comprises calculating a reflection angle using the optical flow process.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method for generating a velocity model for a subsurface area, comprising:
   obtaining, at a data processing apparatus, source wavefields and residual wavefields, wherein the source wavefields and the residual wavefields are calculated based on seismic data associated with the subsurface area;
   decomposing, by the data processing apparatus, the source wavefields and the residual wavefields into a subsurface azimuth and reflection angle domain, wherein the decomposing the source wavefields and the residual wavefields into the subsurface azimuth and reflection angle domain comprises calculating decomposed source wavefields and decomposed residual wavefields based on subsurface azimuth angles and subsurface reflection angles for a plurality of time steps;

calculating, by the data processing apparatus, a plurality of gradient direction components based on the decomposed source wavefields and the residual wavefields;

scaling, by the data processing apparatus, the plurality of gradient direction components based on azimuths and angles associated with each of the plurality of gradient direction components;

calculating, by the data processing apparatus, a gradient direction based on the scaled gradient direction components;

generating the velocity model using the gradient direction; and generating images of the subsurface area by using the velocity model.

2. The method of claim 1, further comprising: updating the velocity model using an iterative process, wherein a different scaling factor is used in each iteration of the iterative process.

3. The method of claim 2, wherein the iterative process includes a first iteration and a second iteration, a first scaling factor corresponding to a first angle is used in the first iteration, a second scaling factor corresponding to a second angle is used in the second iteration, and the first angle is larger than the second angle.

4. The method of claim 1, wherein the decomposing is performed using an optical flow process.

5. The method of claim 1, wherein the scaling comprises: applying a filter on the plurality of gradient direction components based on a range of azimuth and reflection angle.

6. The method of claim 1, wherein the scaling comprises: applying a weighting function that weighs each of the plurality of gradient direction components with a respective weighting factor.

7. The method of claim 1, wherein the decomposing comprises calculating a reflection angle using an optical flow process.

8. A non-transitory computer-readable medium storing instructions which, when executed, cause a computing device to perform operations comprising:

obtaining, at a data processing apparatus, source wavefields and residual wavefields, wherein the source wavefields and the residual wavefields are calculated based on seismic data associated with a subsurface area;

decomposing, by the data processing apparatus, the source wavefields and the residual wavefields into a subsurface azimuth and reflection angle domain, wherein the decomposing the source wavefields and the residual wavefields into the subsurface azimuth and reflection angle domain comprises calculating decomposed source wavefields and decomposed residual wavefields based on subsurface azimuth angles and subsurface reflection angles for a plurality of time steps;

calculating, by the data processing apparatus, a plurality of gradient direction components based on the decomposed source wavefields and the residual wavefields;

scaling, by the data processing apparatus, the plurality of gradient direction components based on azimuths and angles associated with each of the plurality of gradient direction components;

calculating, by the data processing apparatus, a gradient direction based on the scaled gradient direction components;

generating a velocity model using the gradient direction; and generating images of the subsurface area by using the velocity model.

9. The non-transitory computer-readable medium of claim 8, the operations further comprising: updating the velocity model using an iterative process, wherein a different scaling factor is used in each iteration of the iterative process.

10. The non-transitory computer-readable medium of claim 9, wherein the iterative process includes a first iteration and a second iteration, a first scaling factor corresponding to a first angle is used in the first iteration, a second scaling factor corresponding to a second angle is used in the second iteration, and the first angle is larger than the second angle.

11. The non-transitory computer-readable medium of claim 8, wherein the decomposing is performed using an optical flow process.

12. The non-transitory computer-readable medium of claim 8, wherein the scaling comprises: applying a filter on the plurality of gradient direction components based on a range of azimuth and reflection angle.

13. The non-transitory computer-readable medium of claim 8, wherein the scaling comprises: applying a weighting function that weighs each of the plurality of gradient direction components with a respective weighting factor.

14. The non-transitory computer-readable medium of claim 8, wherein the decomposing comprises calculating a reflection angle using an optical flow process.

15. A device, comprising:

at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising:

obtaining source wavefields and residual wavefields, wherein the source wavefields and the residual wavefields are calculated based on seismic data associated with a subsurface area;

decomposing the source wavefields and the residual wavefields into a subsurface azimuth and reflection angle domain, wherein the decomposing the source wavefields and the residual wavefields into the subsurface azimuth and reflection angle domain comprises calculating decomposed source wavefields and decomposed residual wavefields based on subsurface azimuth angles and subsurface reflection angles for a plurality of time steps;

calculating a plurality of gradient direction components based on the decomposed source wavefields and the residual wavefields;

scaling the plurality of gradient direction components based on azimuths and angles associated with each of the plurality of gradient direction components;

calculating a gradient direction based on the scaled gradient direction components;

generating a velocity model using the gradient direction; and generating images of the subsurface area by using the velocity model.

16. The device of claim 15, the operations further comprising: updating the velocity model using an iterative process, wherein a different scaling factor is used in each iteration of the iterative process.

17. The device of claim 16, wherein the iterative process includes a first iteration and a second iteration, a first scaling factor corresponding to a first angle is used in the first iteration, a second scaling factor corresponding to a second angle is used in the second iteration, and the first angle is larger than the second angle.

18. The device of claim 15, wherein the decomposing is performed using an optical flow process.

19. The device of claim 15, wherein the scaling comprises: applying a filter on the plurality of gradient direction components based on a range of azimuth and reflection angle.

20. The device of claim 15, wherein the scaling comprises: applying a weighting function that weighs each of the plurality of gradient direction components with a respective weighting factor.

* * * * *